Figure 1:
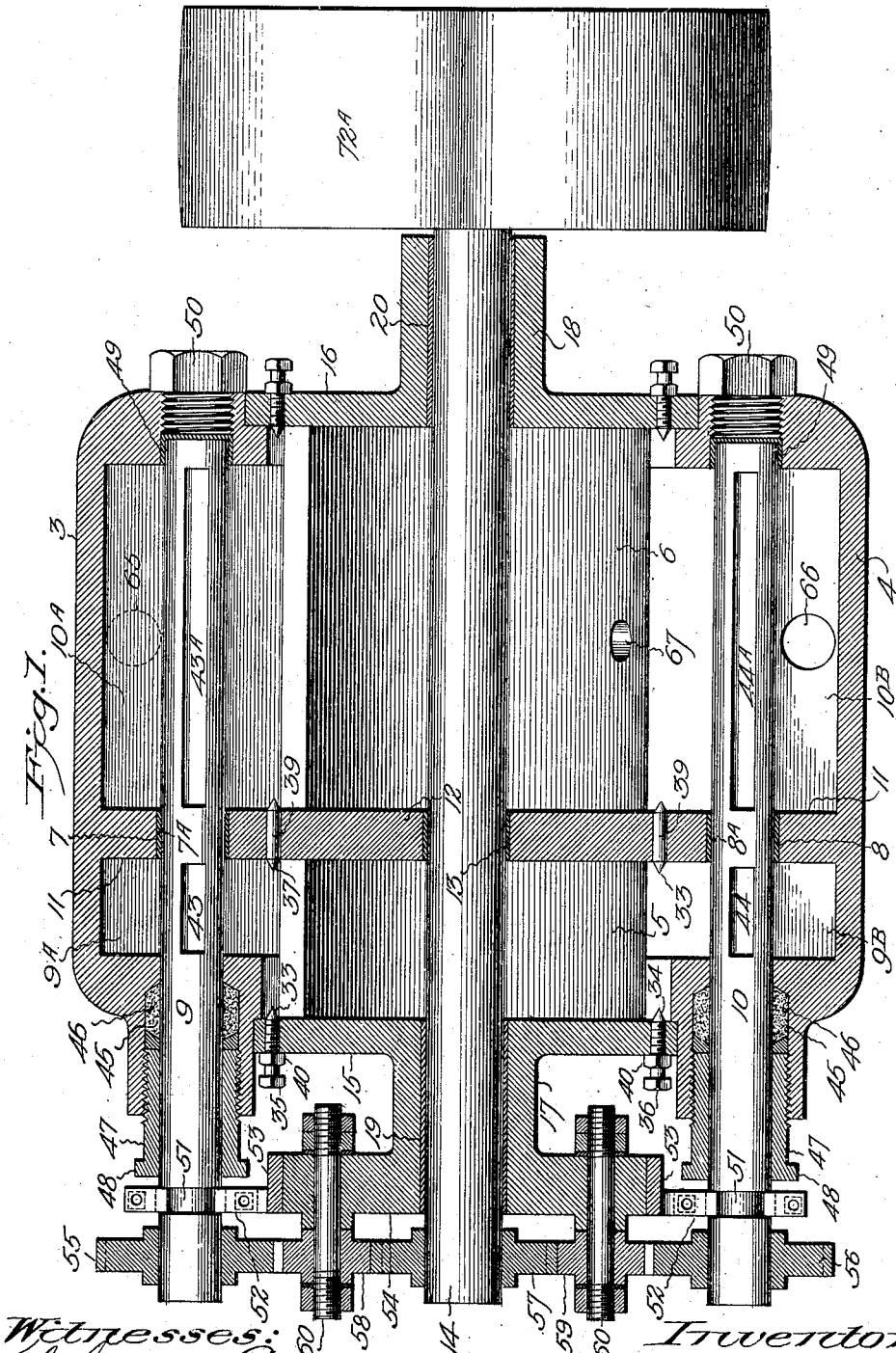

No. 888,806. PATENTED MAY 26, 1908.
A. HOPKINS.
ROTARY ENGINE.
APPLICATION FILED JULY 30, 1906. RENEWED OCT. 17, 1907.

5 SHEETS—SHEET 1.

Witnesses:
G. Sargent Elliott.
Adella M. Fowle

Inventor:
Alton Hopkins
By H. S. Bailey. Attorney.

No. 888,806.  
A. HOPKINS.  
ROTARY ENGINE.  
APPLICATION FILED JULY 30, 1906. RENEWED OCT. 17, 1907.  
PATENTED MAY 26, 1908.

6 SHEETS—SHEET 2.

Witnesses:  
G. Sargent Elliott.  
Adella M. Fowle

Inventor:  
Alton Hopkins  
By H. S. Bailey, Attorney.

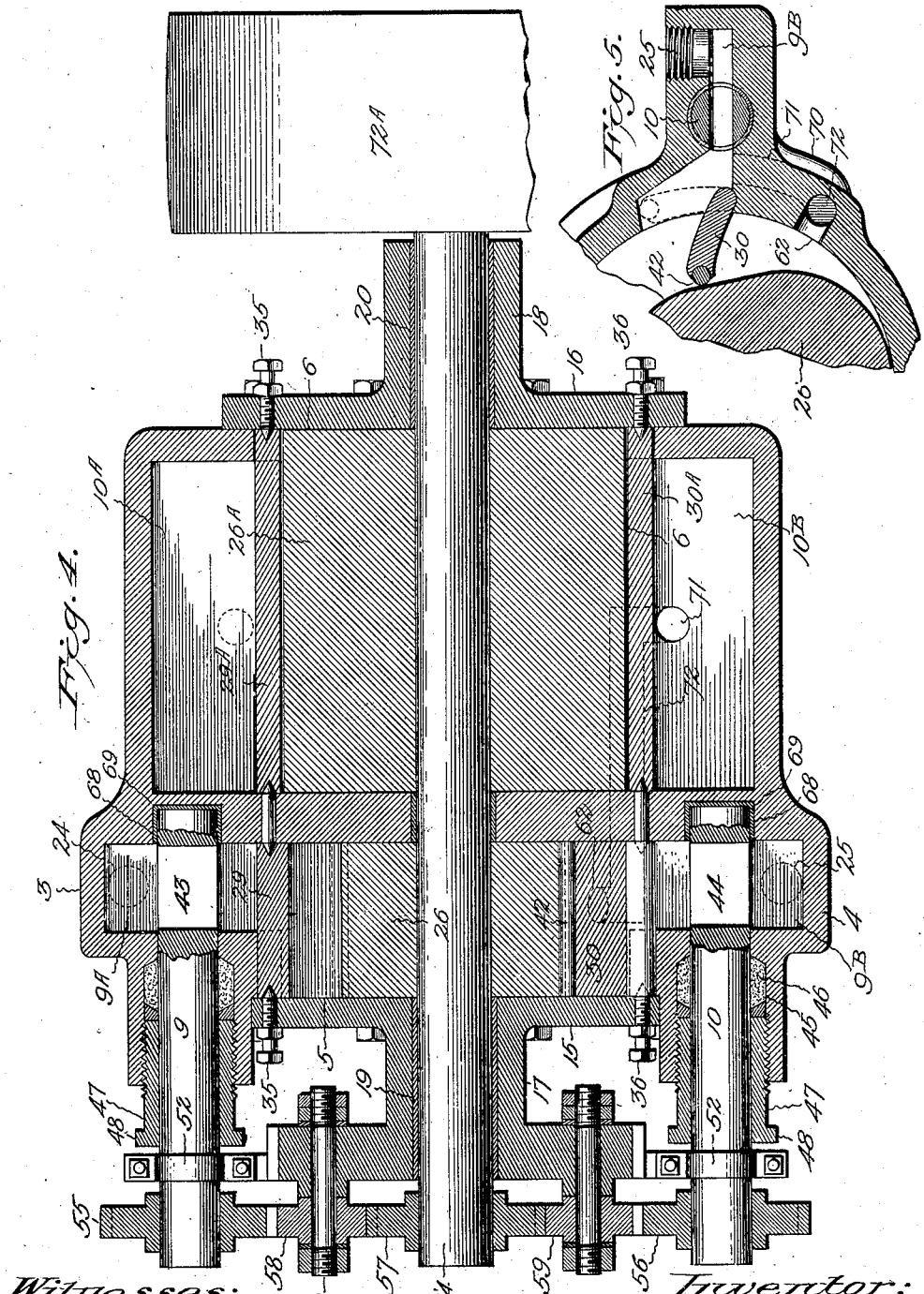

No. 888,806.  
PATENTED MAY 26, 1908.  
A. HOPKINS.  
ROTARY ENGINE.  
APPLICATION FILED JULY 30, 1906. RENEWED OCT. 17, 1907.

5 SHEETS—SHEET 4.

Witnesses:  
G. Sargent Elliott.  
Adella M. Fowle.

Inventor:  
By Alton Hopkins  
H. S. Bailey. Attorney.

No. 888,806.
A. HOPKINS.
ROTARY ENGINE.
APPLICATION FILED JULY 30, 1906. RENEWED OCT. 17, 1907.
PATENTED MAY 26, 1908.
5 SHEETS—SHEET 5.
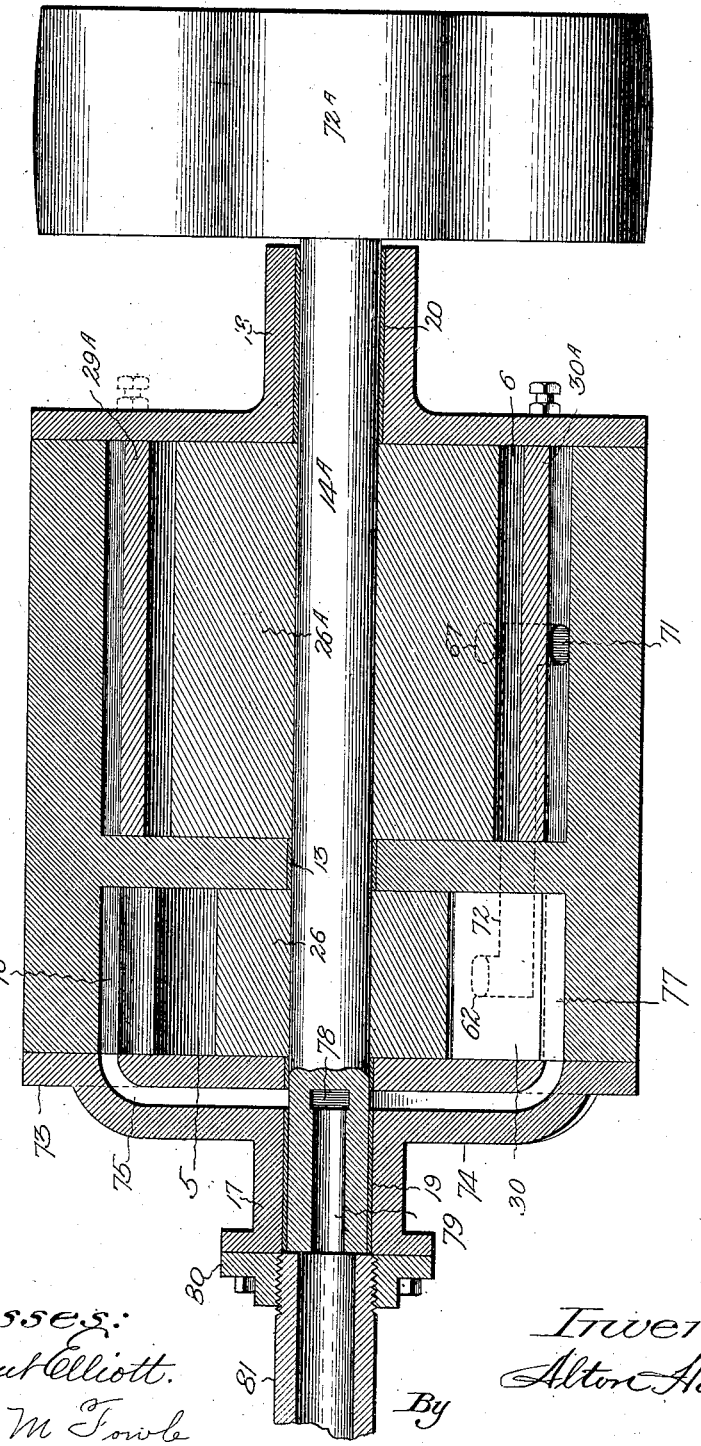

UNITED STATES PATENT OFFICE.

ALTON HOPKINS, OF DENVER, COLORADO.

ROTARY ENGINE.

No. 888,806.   Specification of Letters Patent.   Patented May 26, 1908.

Application filed July 30, 1906, Serial No. 328,412.   Renewed October 17, 1907.   Serial No. 397,919.

*To all whom it may concern:*

Be it known that I, ALTON HOPKINS, a citizen of the United States of America, residing in the city and county of Denver and State of Colorado, have invented a new and useful Rotary Engine, of which the following is a specification.

Figure 2:
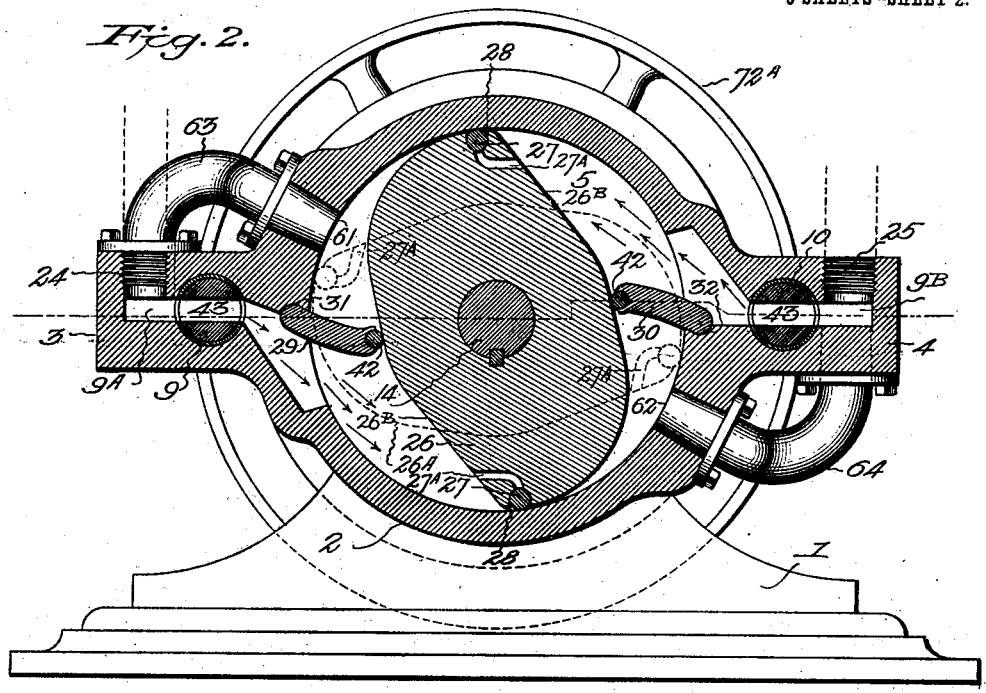
Figure 3:
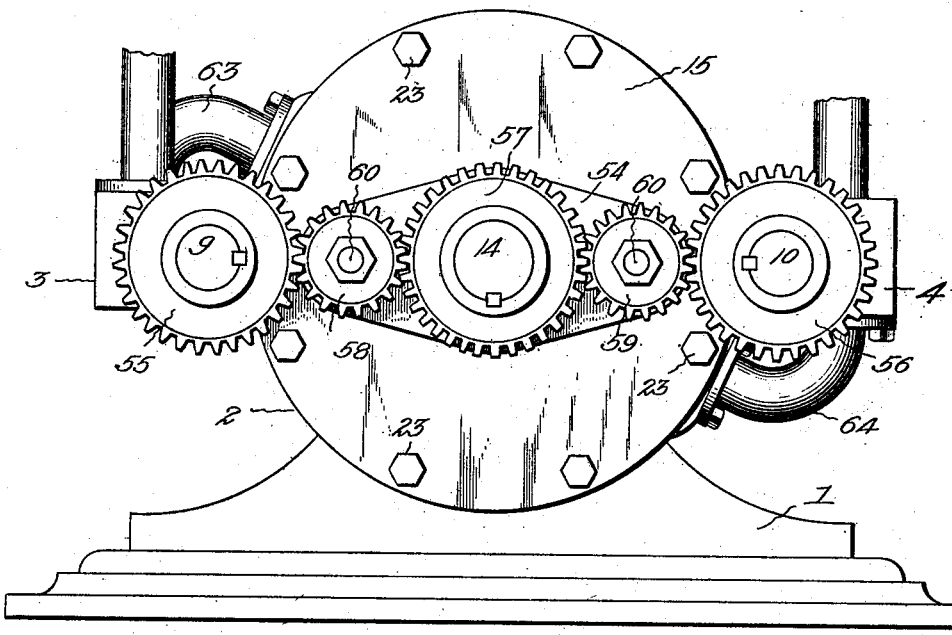
Figure 6:
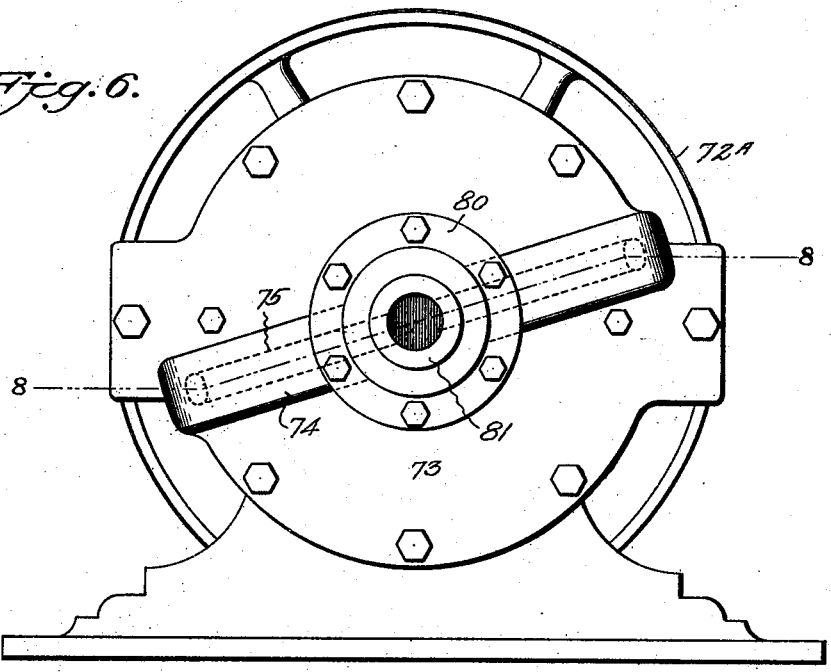
Figure 7:
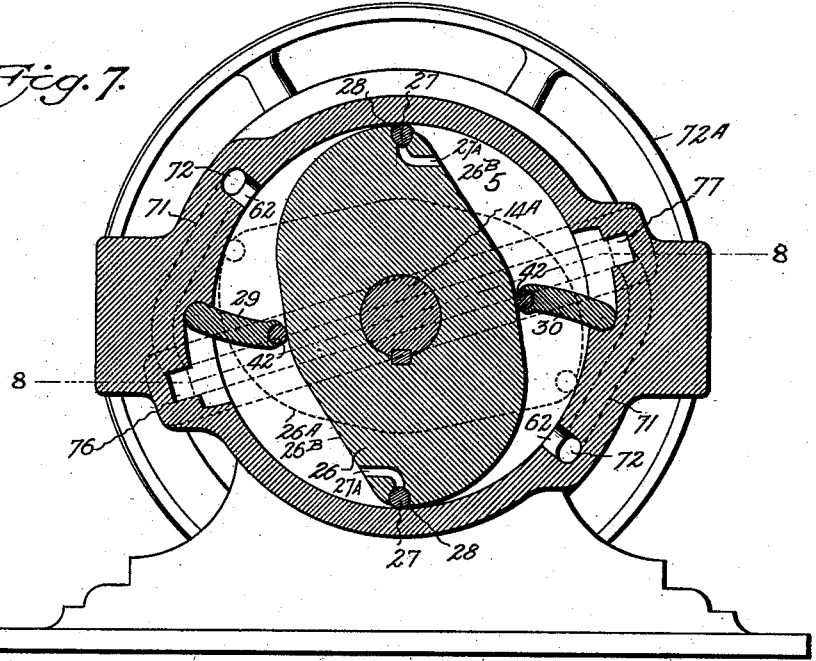

My invention relates to improvements in rotary engines, and the objects of my invention are: First, to provide a rotary engine having a gate closing steam port. Second, to provide a rotary engine having two independent valve controlled steam inlets to opposite sides of the cylinder and pistons. Third, to provide a rotary engine having a high and low pressure cylinder, containing pistons, a plurality of independent steam entrance ports, arranged at predetermined points in the circumference of said cylinder, and a swinging gate valve in each cylinder, adapted to prevent a counter-pressure of steam on the pistons. Fourth, to provide a rotary engine having a plurality of independent steam or other actuating fluid inlet ports, arranged at predetermined points around the inner peripheral surface of the cylinder. Fifth, to provide a double cylinder rotary engine arranged to use the exhaust steam of the high pressure cylinder expansively in the low pressure cylinder. Sixth, to provide a compound rotary engine, having a plurality of independent steam inlets into the high pressure cylinder, and a plurality of exhaust ports in the high pressure cylinder leading the exhaust steam from the high pressure cylinder to a plurality of steam inlets on the low pressure cylinder, and a plurality of suitable exhaust ports in the low pressure cylinder leading to the atmosphere. And seventh, to provide a compound rotary engine provided with a plurality of independent steam or other actuating fluid inlet ports entering the high pressure cylinder at predetermined points in its periphery, a plurality of exhaust ports in said high pressure cylinder arranged to lead the exhaust from the high pressure cylinder into the low pressure cylinder, a swinging gate valve pivotally hinged at the entrance of each steam port of both the high and low pressure cylinders, and provided with a plurality of automatically operating independent rotary valves arranged to control each of said ports, and provided with an axial shaft carrying pistons secured thereto, and rotatably mounted in the cylinders of said compound rotary engine, and provided with predeterminedly arranged steam impact surfaces. I attain these objects by the mechanism illustrated in the accompanying drawings, in which:

Figure 1, is a horizontal sectional view of my improved rotary engine. Fig. 2, is a transverse, sectional view through the high pressure cylinder of the same. Fig. 3, is an end elevation of my rotary engine. Fig. 4, is a horizontal sectional view showing a modification of the valve mechanism. Fig. 5, is a fragmental, sectional view of Fig. 4, showing a modification of the exhaust ports leading from the high pressure cylinder to the low pressure cylinder. Fig. 6, is an end view of a modified form of the engine, in which the rotary valves are dispensed with, and the steam admitted through a port in the power shaft. Fig. 7, is a transverse, sectional view thereof, through the high pressure cylinder. And Fig. 8, is a horizontal, sectional view of the same, on the line 8—8 of Figs. 6 and 7.

Similar letters of reference refer to similar parts throughout the several views.

Referring to the drawings, the numeral 1, designates the base or foundation plate of my engine; 2, designates the casing, which may be cast integral with the base plate, if desired. This casing is preferably cylindrical in form, and is provided at its opposite sides with projecting lug portions 3 and 4, which form steam chests, preferably projecting horizontally from it. The cylinder casing may contain only one piston cylinder and piston if desired, but I preferably illustrate my improved rotary engine with a high and low pressure cylinder within one casing; consequently the casing 2 contains two cylinders 5 and 6. In the central portions of each of the steam chests 3 and 4, I form circular apertures 7 and 8. These apertures are provided with anti-friction bushings $7^A$ and $8^A$, and they are bored out to form journal bearings for rotating valves and stems 9 and 10. The interiors of the lugs are provided with steam inlet ports $9^A$ and $9^B$ and $10^A$ and $10^B$, which are separated from each other by a partition 11. These ports are arranged opposite the cylinders and lead directly into them, the ports $9^A$ and $9^B$ on opposite sides of the cylinder leading to the high pressure cylinder 5, and the ports $10^A$ and $10^B$ leading to the low pressure cylinder 6. The cylindrical casing is preferably made with both of its opposite ends open, and with a partition 12 formed at a predetermined point intermediate of its ends, thus forming a cylindrical space on both sides of the partition. This partition is provided with an axial bore 13, which contains an anti-friction bushing of brass or other suitable metal. This bushing forms a journal bearing for a main piston driving shaft 14, which extends through both cylinders in opposite directions from the partition, and extends through the cylinder heads 15 and 16, which are provided with outwardly extending hubs 17 and 18, which are provided with bushings 19 and 20. These cylinder heads are secured to the ends of the casing, by any suitable means, but preferably by cap screws 23. The steam enters the steam chests 3 and 4, to the valve ports 9$^A$ and 9$^B$, of the high pressure cylinder through the apertures 24 and 25, the entrances of which are threaded to receive the threaded end of pipes, which lead to a supply of steam or other suitable motive fluid. On the piston or driving shaft, I secure a piston 26, which comprises a plurality of steam impact surfaces, 26$^A$, which fit closely but rotatably between the cylinder head and the partition, and the inner peripheral surface of the cylindrical casing. On the piston driving shaft, I also mount a second piston 26$^A$, which is formed to fit the inner periphery of the cylinder 6, between its cylinder head and the partition. The opposite ends of these pistons are curved in opposite directions from opposite sides of each piston from about diametrical points through the lesser thickness and diameter of the piston to longest diameter of its ends, from which point straight surface extends to about the center of the length of the piston. These pistons are secured to the piston shaft by any suitable means, but are preferably securely keyed to them, and in the two opposite peripheral edges of the pistons I secure in any suitable manner packing material of any suitable character, preferably illustrating a roller packing 27, which may be of any suitable material, arranging it in semi-circular recesses 28, to bear against the inner peripheries of the cylinders. And in order to insure a close bearing contact of the roller against the inner periphery of the cylinder, I provide each roller in the piston with a constant outward pressure, and preferably carry out this feature of my invention in the following manner: In each steam impact surface 26$^B$ of the piston, I form steam ports 27$^A$, which extend into the bottom of the recesses 28, in which the rollers are seated directly under the roller. The steam flowing into the cylinder under pressure strikes the impact surfaces of the piston and flows into these ports and forces the roller packings against the inner periphery of the cylinder. The steam pressure in effect practically buoys up and holds the roller packings against the inner periphery of the cylinder, and they are free to either roll against the cylinder or slide against its surface, as the pistons rotate. If desired the steam port may be dispensed with, and a resilient member of any character may be placed in the recess 28 below the rubber rollers, and be arranged to hold the rollers with constant resilient pressure against the inner periphery of the cylinder, or the rubber rollers themselves may be made large enough relative to the recess, and the inner surface of the cylinder, to bear against the cylinder with their own inherent elastic and resilient tension.

The steam inlet ports are preferably arranged to enter the cylinders on a horizontal plane, but are extended circumferentially around the inner peripheral shell of the cylinders in the direction in which the piston rotates a short distance, the ports being at this point an open recess in the inner peripheral surface of the cylinder, which is adapted to form a housing for the swinging valves 29 and 30, and 29$^A$ and 30$^A$. These valves are preferably made concavo-convex in form, and are pivotally supported in curved recesses 31 and 32, formed in the edge of the ports at their junction with the cylinder, and also by tapering centers 33 and 34, which are formed on the ends of cap screws 35 and 36, which are threaded to threaded holes formed in the cylinder heads through which they extend, and on center points 37, and 38, which are formed on the opposite ends of pins 39, which are secured in the partition and project from it into both cylinders. The ends of the valves are formed with tapering center recesses adapted to receive the tapering center points of the screws. The cap screws 35 and 36, are provided with check nuts 40, to secure them in adjusted positions against accidental displacement; consequently these swinging valves which I term gate valves, swing out of the port recesses against the sides of the piston, when steam is admitted from the valve into the port, and are pushed back into the curved surface of the piston as they rotate, and when these gate valves are closed, the ports are in a measure closed. They are used to guide the steam above the horizontal centers of the pistons. These gate valves may be dispensed with if desired, as the area of the cylinder above its horizontal center is so much greater than the area below the horizontal center at the point of steam intake, and the movement of the piston is so rapid that their use while an advantage is not absolutely necessary to the operation of the engine. I preferably employ them however, and in order to make their contacting points with the piston practically steam tight, I provide their piston engaging ends with a suitable packing device or material, preferably forming a concaved recess in the end of each gate valve, in which I place a roller 42, which may be composed of any suitable or anti-friction material.

In the drawings I have preferably illustrated my improved rotary engine with two independent steam inlets, and two independent valves and steam inlet ports into the two cylinders from the valves, the valves and their ports being arranged on opposite sides of the cylinders; consequently the gate valves are arranged on opposite sides of both the high and low pressure cylinders, and are preferably pivoted on a diametrical axial line of the horizontal plane of the cylinder and piston and piston shaft, and they open and close synchronously in the high pressure cylinder and also in the low pressure cylinder, but in alternate order from their action in the high pressure cylinder, as will be explained more fully hereinafter. The valves 9 and 10, are provided with steam inlet ports 43 and 43$^A$ and 44 and 44$^A$, which register with the ports 9$^A$ and 9$^B$ and 10$^A$ and 10$^B$ as the valves rotate, and form a clear steam port passage from the steam inlet aperture of the valve chest through the valve's ports to the valve gates and past them to the cylinders. The valves 9 and 10 are each provided with valve stem portions, which project through any suitable stuffing boxes, but which preferably consist of the packing apertures 45, the packing 46, and the glands 47, which are preferably threaded to the packing apertures 45, the packing 46, and the glands 47, which are preferably threaded to the packing apertures and are provided with a wrench receiving collar portion 48, at their outer ends; the inner ends of the valves are preferably seated in cupped bushing 49, which extends only partially through the rear wall of the casing, which is threaded to receive a thrust nut 50, by which the position of the ports of these valves may be set relative to the partition 11, and to their journal bearings. The forward ends of these valves are provided with reduced neck portions 51, in which a divided ring collar 52, is loosely clamped, the collar being formed on the end of a bracket 53, which is secured to a flange 54, formed on the hub of the adjacent cylinder head. Upon the ends of the valve stems I secure pinions 55 and 56, and upon the end of the piston's shaft I also secure a gear 57, which may be made large enough in diameter to mesh with the pinions on the valve stems, but I preferably interpose between the driving gear of the shaft and the pinions on the valve stems, idler pinions 58 and 59; consequently I make the piston's driving shaft gear of a diameter to allow the idler pinions to be interposed between it and the valve stem pinions, and I support these idler pinions on a stud bolt 60, which is secured to the flange 54 of the adjacent cylinder head.

In Fig. 4, which is a horizontal sectional view of the modification of the arrangement of the valves and of the exhaust valve ports leading from the exhaust ports of the high pressure cylinder to the low pressure cylinder, the valves extend across the steam chest of the high pressure cylinder only and terminate in the partition in the steam chest between the two cylinders, an aperture 68 being formed in this partition which does not extend quite through the partition, which is preferably provided with a bushing 69, in which the inner ends of the valves are rotatably seated, otherwise both valves are the same in every respect. Consequently in this arrangement the low pressure cylinder is not provided with a valve controlled inlet port, but the exhaust steam from the high pressure cylinder flows directly into it from the exhaust ports of the low pressure cylinder, and I preferably arrange these exhaust ports in this arrangement of the engine in the following manner: On the outside of the casing of the low pressure cylinder I cast a port lug 70, in which ports 71 are formed, which register with the exhaust inlet ports 10$^A$, and 10$^B$ of the low pressure cylinder, and these ports 71 register with ports 72 formed in the shell of the casing on opposite sides of it, which intersect ports 61 and 62 of the high pressure cylinder. Consequently the exhaust steam from the high pressure cylinder flows directly into the opposite sides of the low pressure cylinder, and does not pass through the valves as shown in Figs. 1 and 2.

Upon the opposite end of the piston's driving shaft, I secure a fly wheel pulley 72$^A$, from which power may be transmitted from the engine by belt. While the pistons may be secured to the driving shaft in alinement with each other, they are preferably secured to the driving shaft to stand in an angular position that will permit the low pressure cylinder to receive the exhaust from the high pressure cylinder the instant the high pressure cylinder passes its exhaust ports, or they can be positioned at the quarter or at right angles to each other. The valves 9 and 10, are also set with their ports standing to work in unison with this arrangement of the pistons.

The operation of my improved rotary engine is as follows: The steam or other motive fluid enters the steam inlet ports of the valve chests into the ports 9$^A$ and 9$^B$, and as the valves are rotated the steam passes through their ports to the gate valves and forces them to swing open against the straight side of the high pressure cylinder piston, which forces this piston to rotate as the steam pressure is applied to the straight portions of its opposite sides at the same time, both above and below its horizontal centers, as shown by the arrows in Fig. 2; consequently it is driven by two opposite steam pressures, and at a short distance from the gate valves in the direction of the piston's rotative movement, exhaust ports 61 and 62 are formed through the casing, which are connected to curved pipes 63 and 64, that extend from these exhaust ports to steam inlet port apertures 65 and 66, that lead into the steam inlet ports 10$^A$ and 10$^B$, from which the steam flows through the ports 43$^A$ and 44$^A$ of the valves 9 and 10 that lead to the low pressure cylinder, these ports being arranged relative to the ports 43 and 44, to admit the steam to the opposite sides of the low pressure cylinder, the same as it is admitted to the high pressure cylinder, and the gate valves of the cylinder are opened by the steam and all of these valves are closed by the curved portion of the pistons as they rotate and are pushed back into their port recesses until the pistons pass them and they are again opened by the inflowing steam. The rotation of the pistons rotates the driving shaft, and its gear, which in turn rotates the idler pinions and the idler pinions rotate the pinions on the valve stems; consequently the valves are rotated in operative order to always start and to admit steam to operatively drive the pistons. Exhaust ports 67 are formed through the shell of the casing to the atmosphere, preferably in alinement with the steam inlet ports. The steam from the high pressure cylinder is thus used expansively in the low pressure cylinder. If desired two or more pairs of cylinders can be placed on one driving shaft, or one low pressure cylinder and piston can be placed between two high pressure cylinders.

In Figs. 6, 7, and 8, I have illustrated a change in the construction of the engine, in the manner of admitting steam to the high pressure cylinder. In this form of the engine, the rotary valves 9 and 10, are dispensed with, and the front cylinder head or bonnet 73, is formed with a longitudinal rib or projection 74, which extends from diametrically opposite sides of the hub 17, and this rib is provided with a port 75, which opens into the hub, and also communicates with chambers or ports 76 and 77, back of the gates 29 and 30. The power shaft 14$^A$, is provided with a transverse port 78, which registers with the port 75 in the cylinder head, and it is also provided with an axial port 79, which extends from the forward end of the shaft, and intersects the port 78. A pipe flange 80, is bolted to the outer end of the hub 17, and is interiorly threaded to receive a steam inlet pipe 81, which communicates directly with the axial port 79. Thus, the steam will enter the port 79, and pass through port 78 to the port 75, in the cylinder head, and thence to the chambers 76 and 77 back of the gate 29 and 30 of the high pressure cylinder. The piston 26, will be revolved, and the exhaust steam will pass into the low pressure cylinder through ports 62, 72, and 71, as previously described, and the supply of steam to the port 75 will be intermittently cut off, as the port 78, by the revolution of the shaft, assumes a position at right angles to the port 75, or in other words, as the entrance to the port 75, is closed by the solid portion of the shaft.

My rotary engine is adapted for all of the general uses for which power is required, and is especially adapted for use as a motor for automobiles. It is simple in construction, compact, light in weight, and small of size for the amount of its power; and while I have especially designed my invention as a rotary steam or other expansive fluid engine, it is obvious that it can be used as an air compressor, and also as a pump, and I contemplate the use of my invention as an air compressor and as a pump.

Having described my invention, what I claim as new and desire to secure by Letters Patent is:

1. In a rotary engine, the combination of a casing having a high and low pressure cylinder, of a rotary piston in each cylinder, each piston having two oppositely arranged steam impact surfaces, two oppositely arranged and independent steam inlet ports leading into each cylinder, two independent rotary valves in said steam inlet ports controlling the ports, ports to both cylinders, an exhaust port for each valve mechanism, and a high pressure cylinder connected to the steam inlet and valve ports of said low pressure cylinder.

2. In a rotary engine the combination with the casing, of the high and low pressure cylinders separated by a partition, the steam chests on opposite sides of said casing, the independent steam inlet ports separated by a partition, the independent rotary valves having ports arranged to admit steam in unison at opposite sides of each cylinder, and arranged to admit the exhaust steam of the high pressure cylinder at a predetermined time to the low pressure cylinder, the driving shaft extending axially through both cylinders, the oblong pistons having opposite steam impact surfaces and opposite curved ends, and steam impact portion, a steam inlet swinging gate valve pivotally mounted at the junction of each steam inlet port with the interior periphery of each cylinder, arranged to be opened by the inflowing steam pressure and to be closed by said curved back portions of said pistons, and means for rotating said valves from said driving shaft.

3. In a rotary engine, the combination with the casing, the high and low pressure cylinders, the cylinder heads, and the valve chests, arranged on opposite sides of said cylinder, a pair of rotating valves in said valve chests, each having ports adapted to admit steam to each cylinder, a main driving shaft axially mounted in said cylinder heads and casing, pistons comprising members having their opposite ends arranged to fit rotatably the inner periphery of said cylinders, and means including ports for conveying the actuating fluid from the high pressure cylinder to the low pressure cylinder.

4. In a rotary engine, the combination with the casing having two cylinders therein, divided by a partition, the cylinder heads secured to said casing, the taper-center points in said partition, the adjustable center-points in said cylinder heads, the valve chests on said casing, the steam inlet ports in said valve chests, and the curved recesses at the junction of said ports and the inner periphery of said cylinder, and swinging gate valves pivotally supported on said pivotal centers and in said recesses.

5. In a rotary engine, the combination of a casing, containing two cylinders, a piston rotatably mounted in each cylinder, a driving shaft secured to said pistons, ports arranged to admit steam from a source of steam supply to one of said cylinders, ports arranged to lead the steam from the first cylinder and piston to the second cylinder and piston, two independent steam admitting rotary valves arranged to control the admittance of steam to said cylinders and pistons, and means connected with said main shaft and valves for rotating said valves.

6. In a rotary engine, the combination of a casing, having a high and a low pressure cylinder separated by a partition, cylinder heads secured to the opposite ends of said casing, a shaft journaled in said partition and cylinder heads, pistons secured to said shaft and rotatably mounted in each cylinder, two oppositely arranged and independent valve chests along both cylinders in said casing, two independent steam inlet ports in said high pressure cylinder, two independent rotary valves arranged having steam passage ports rotatably mounted in each valve chest to control said ports, two independent exhaust ports and exhaust pipes extending from said high pressure cylinder to said low pressure cylinder, steam inlet ports in said oppositely arranged independent valve chests, two steam impact surfaces on opposite sides of each of said pistons, two curved surfaces on opposite sides of each of said pistons from said impact surfaces, independent swinging gate valves pivotally mounted in each of the ports, adapted to swing out against the curved surfaces of said pistons, and to be moved by said pistons out of their paths as they rotate, and means for rotating said valves to operatively admit steam to the piston of said high pressure cylinder, and suitable exhaust ports in said low pressure cylinder.

7. In a rotary engine, the combination of the casing having a high and low pressure cylinder, a piston in each cylinder of oblong form, each piston containing a steam impulse surface and a curved surface, valve controlled steam inlet ports to said high pressure cylinders, a gate valve pivotally hinged to swing from said ports against the curved surface of said pistons, a packing roller in the free end of each gate valve adapted to engage the surface of said pistons, an axial driving shaft on which said pistons are secured in a predetermined angular relation to each other, steam ports leading from said high pressure cylinder to said low pressure cylinder, and suitable exhaust ports leading from said low pressure cylinder to the atmosphere.

8. In a rotary engine, the combination with a suitable casing having a high and low pressure cylinder separated from each other by an integral portion in said casing, cylinder heads on the opposite ends of said casing, a pair of steam chests one on each side of said casing, a pair of steam inlet ports on opposite sides of each cylinder, having a partition between them, a steam inlet in each port of said high pressure cylinder, inlet apertures in each port of said low pressure cylinder, steam exhaust apertures in said high pressure cylinder, and steam exhaust pipes connected to the exhaust aperture of said low pressure cylinder and extending to the steam inlet apertures in the ports of said low pressure cylinder, rotating valves extending through both cylinders and projecting beyond said casing, a driving shaft rotatably mounted in said casing and cylinder heads, a gear on said driving shaft, and means including gears connected with said driving shaft's gear for rotating said valves.

9. In a rotary engine, the combination of the cylindrical casing having a suitable foundation bed plate, two steam chests on said casing, a high and low pressure cylinder in said casing, two steam inlet ports on said valve chests and cylinders, an axial driving shaft, pistons secured on said shaft to stand at a predetermined angle relative to each other, valves at the entrance of said ports into said cylinder adapted to prevent back pressure of inflowing steam on said piston, a roller packing between said pistons and the inner periphery of said cylinders, and means for conveying the exhaust steam from the high pressure cylinder to the low pressure cylinder, and the exhaust steam from the low pressure cylinder to the atmosphere.

10. In a rotary engine, the combination of the casing containing a plurality of cylinders, a plurality of independent valve chests and valves and ports for admitting steam at a plurality of different predetermined points in said cylinder, and an axial shaft having a plurality of pistons rotatably mounted in said cylinders, having a plurality of oppositely arranged steam engaging surfaces adapted to receive steam synchronously from said plurality of ports, means including a plurality of ports connecting said cylinders for using steam expansively in said cylinders, and means including gears connected to said axial shaft and valve for operating said valves.

11. In a rotary engine, the combination of the casing, having a high and low pressure cylinder, the cylinder heads, the driving shaft and pistons, the two steam chests, and the four steam inlet ports, of the two valves rotatably mounted in said ports and provided with diametrically arranged slots through them registering with said four ports arranged in predetermined order relative to each other, said valves being provided with stem portions projecting beyond said casing and suitable stuffing boxes and glands on said casing around said glands.

12. In a rotary engine, the combination with the casing, the cylinders therein, the cylinder heads, and the axial driving shaft, and means for packing said driving shaft on said cylinder heads, of pistons secured to said shaft to stand in said cylinders at a predetermined angle to each other, provided with oppositely arranged steam impact surfaces, swinging valves pivotally hinged at the junction of said four steam inlet ports with said cylinder, oppositely arranged curved surfaces on each of said pistons adapted to automatically close said valves as said pistons rotate, a rotary packing between said valves and the curved surfaces of said pistons, and a rotary packing between the periphery of said pistons and the inner periphery of said cylinders.

13. In a rotary engine, the combination with the casing, of the cylinders therein, the steam chests, the pistons, the axial piston shaft, and the steam inlet ports having a partition between them, the valve seat bushings in said steam chest ports, the circular valves rotatably mounted in said valve seat bushings, an adjustable thrust nut at one of said valves threaded to said steam chests, the diametrical ports through said valves registering with the ports of said cylinders, the stuffing boxes in said steam chest surrounding said valves, means including the idler and piston shaft gear and the valve's gears for rotating said valves, and a collar on each valve arranged to take the opposite end thrust of said valves from said thrust nuts.

14. In a rotary engine, the combination with the casing, high and low pressure cylinders separated by a partition of said casing, the cylinder heads, the two valve chests, the pistons and the piston shaft, of the steam inlet ports in said steam chests, divided by a partition, the swinging gate valves pivotally secured to said ports, the recesses in said ports and in the inner periphery of said cylinder for said gate valves, the double pointed tapering centers in the dividing partitions between said cylinders, the adjustable tapering centers in said cylinder heads, and the tapering center recesses in the ends of said gate valves.

15. In a rotary engine, the combination with the casing, of the cylinder, the pistons, the piston's shaft, the four steam inlet ports for both cylinders, the two valves, and the end thrust adjustable nuts and collars for said valves, with a gear on said piston shaft, a gear on each valve, and an idler gear in mesh with each valves gear, and in mesh with said piston's shaft gear.

16. In a rotary engine, the combination of compound cylinders integrally combined in a cylindrical casing, a plurality of independent steam inlet valves arranged at predetermined points in the high pressure cylinder, a rotary piston in each cylinder, a swinging gate valve arranged to control the steam inlet port to the piston of said high pressure cylinder and to be closed by said piston's rotative movement; independent exhaust ports extending through the shell of said cylinders from said high pressure cylinder to said low pressure cylinder, and swinging gate valves arranged at the entrance of said exhaust ports into said low pressure cylinder, arranged and adapted to be closed by said low pressure cylinder's piston.

17. In a rotary engine, a cylinder provided with cylinder heads and containing a pair of piston cylinders, a partition between said cylinders, a shaft extending axially through said cylinder and partition, and a piston in each cylinder secured to said shaft, swinging gates on diametrically opposite sides of each cylinder provided with a rotary roller packing on their free ends, and a chamber back of each gate; inlet ports communicating with the chambers of one cylinder; means connected with the shaft for intermittently closing said ports; and ports connecting the two piston cylinders whereby the steam from one cylinder exhausts into and operatively drives the piston of the other cylinder.

In testimony whereof I affix my signature in presence of two witnesses.

ALTON HOPKINS.

Witnesses:
RICHARD MCKNIGHT,
GEORGE H. SETHMAN.